United States Patent [19]
Roe et al.

[11] Patent Number: 5,761,129
[45] Date of Patent: Jun. 2, 1998

[54] METHOD AND APPARATUS FOR I/O MULTIPLEXING OF RAM BUS

[75] Inventors: David Glen Roe, San Jose; Richard Lingard Kalish, Castro Valley, both of Calif.

[73] Assignee: Adaptec, Inc., Milpitas, Calif.

[21] Appl. No.: 824,202

[22] Filed: Mar. 25, 1997

[51] Int. Cl.$^6$ ..................... G11C 13/00
[52] U.S. Cl. ..................... 365/189.01; 365/222
[58] Field of Search ............ 365/189.01, 189.04, 365/222, 189.05, 230.01, 230.03

[56] References Cited

U.S. PATENT DOCUMENTS 5,642,320  6/1997  Jang ......................................... 365/222

*Primary Examiner*—Terrell W. Fears
*Attorney, Agent, or Firm*—Hickman & Martine, LLP

[57] ABSTRACT

A RAM and I/O controller is provided with logic for controlling access to a DRAM and to one or more input and/or output latches, each of which are coupled to a RAM data bus. The logic receives input signals such as a refresh request signal and a RAM access request signal from other circuits or devices, and outputs one or more associated control signals onto a RAM control bus, such as a RAS output signal or a CAS output signal. The logic includes at least one idle state during which the DRAM is in a RAS or CAS precharge period. During the idle state, the logic de-asserts the RAS or CAS output and asserts one or more control signals to the input and/or output latches so as to perform at least one write and/or read operation of miscellaneous data signals with the latches 112 and 114 of FIG. 2a over the temporarily idle RAM data bus. A method is also provided for I/O multiplexing a RAM bus by providing one or more control signals, such as a RAS signal and a CAS signal for a DRAM on a RAM control bus, and performing at least one read operation and/or write operation on a RAM data bus from circuits or devices, other than the DRAM, during one or more of the RAM's precharge cycles or periods.

29 Claims, 3 Drawing Sheets

(Prior-Art)

(Prior-Art)

5,761,129

1

METHOD AND APPARATUS FOR I/O MULTIPLEXING OF RAM BUS

BACKGROUND OF THE INVENTION

The present invention relates generally to the inputting and outputting of signals between a plurality of integrated circuits, and more particularly to the inputting and outputting of non-memory related signals over a memory circuit's data bus in a memory and input/output system.

An integrated circuit (IC) typically includes a circuit die upon which a plurality of circuit components are provided to form a circuit. The IC typically includes a plurality of dedicated input, output, or input/output (I/O) cells that can be used for inputting and/or outputting a variety of electrical signals, such as those relating to the operation of the integrated circuit. These I/O signals can, for example, include control signals, address signals and data signals. The I/O cells typically include an I/O circuit and a bonding pad, each of which are formed on the circuit die. The bonding pad is usually coupled to an I/O pin that is accessible by other circuits.

As is known to those skilled in the art, there are usually only a finite number of dedicated I/O cells and I/O pins that can be efficiently supported for a given circuit die size or IC package size. Thus, if the number of required I/O signals exceeds the number of available I/O cells and pins available for a specific die or package size, the die or package sizes will typically need to be increased to accommodate the additional I/O cells and pins. Adding additional I/O pins or increasing the die size during the design of a custom IC is not uncommon. However, for ICs that are semi-customized, or in some manner constrained to a particular design/size, adding additional I/O signals and changing the die or package, may present serious problems. Increasing the size of the die, for example, tends to increase the costs associated with manufacture of the IC, and can also lead to wasted space on the die, unused I/O pins in the package, and additional space requirements for the IC die and/or package within an intended system circuit (e.g., a printed circuit board).

By way of example, FIG. 1a is a block diagram of a conventional memory and I/O system 10 having an application specific integrated circuit (ASIC) 12 and a dynamic random access memory (DRAM) 14 which are coupled together. Memory and I/O system 10 can, for example, be used within a computer system to provide for the storage and retrieval of data in DRAM 14 by one or more computer processors.

ASIC 12 represents a semi-customized IC having a specific die size and a limited number of I/O pins. Among these I/O pins are, for example, those required to provide an interface to DRAM 14, namely, a RAM control bus 16, a RAM address bus 18, and a RAM data bus 20. ASIC 12 also includes an ASIC I/O interface 22 arranged to transfer I/O signals between ASIC 12 and an external device, such as a microprocessor or the like. ASIC I/O interface 22 can, for example, include an ATA, SCSI, IEEE-1394, or other similar serial or parallel interface.

ASIC 12 also includes an internal I/O circuit 24 which is coupled to ASIC I/O interface 22, and a logic circuit 26 which is coupled between internal I/O circuit 24 and internal I/O circuit 28 and functions to provide external devices access to DRAM 14 via internal I/O circuit 24 and internal I/O circuit 28. As shown, in FIG. 1a, internal I/O circuit 28 is further coupled to RAM control bus 16, RAM address bus

2

18 and RAM data bus 20 (the RAM buses). As is known to those skilled in the art, the RAM buses typically include a plurality of isolated lines through which related I/O signals can be transmitted and received.

Assuming that all of the I/O cells and pins have already been allocated for specific purposes and the application requirements for ASIC 12 required an additional I/O signal, e.g., for indexing an LED, prior-art approaches call for an additional dedicated I/O cell and pin. Applying conventional prior-art approaches, this added I/O requirement could result in the need to increase the size of the circuit die. As a result, the associated manufacturing costs may increase.

Thus, what is desired are methods and apparatuses that enable a greater number of I/O related signals to be input and output from an IC having a limited number of dedicated I/O pins, preferably without having to add an additional dedicated I/O cell and/or increase the size of the IC die.

SUMMARY OF THE THE INVENTION

The present invention provides methods and apparatuses that enable a greater number of I/O related signals to be input and output from an IC, having a limited number of dedicated I/O pins, by using existing RAM data bus lines, during DRAM precharge periods, to input and/or output miscellaneous data signals between the IC and one or more external circuits or devices.

In accordance with one embodiment of the present invention, there is provided a RAM and I/O controller that includes logic for controlling access to a RAM and to one or more input and/or output latches which are each coupled to a RAM data bus. The logic can be embodied in hardware and/or software implementations. The logic, for example, can be a sequential logic circuit implementing a plurality of operating modes, each having specific operating states during which access to the DRAM and latches is controlled.

In this embodiment, the logic receives input signals such as a refresh request signal and a DRAM access request signal from other circuits or devices and outputs one or more associated control signals, such as a row access strobe (RAS) output signal or a column access strobe (CAS) output signal, onto a RAM control bus. Because of the inherent design of the DRAM, the logic includes at least one idle state during which the DRAM is in a RAS or CAS precharge period. As such, during the idle state the RAS and/or CAS output signals are de-asserted to prevent access to the DRAM.

In accord with one aspect of the present invention, during this idle state or precharge period, the logic further outputs one or more control signals to the input and/or output latches whereby at least one write and/or read operation of miscellaneous data signals is conducted with the latches over the temporarily idle RAM data bus.

In another embodiment of the present invention, the writing and/or reading of miscellaneous data signals may be further coordinated or otherwise controlled or timed by a clock signal such that a plurality of writes and/or reads can be accomplished during a single idle state or precharge period.

In another embodiment of the present invention, there is provided a memory and I/O system that includes the RAM and I/O controller (from above), a DRAM that is coupled to a RAM control bus and a RAM data bus, and an I/O device that is coupled to the RAM data bus and to the RAM and I/O controller for accomplishing a write and/or read of miscellaneous data signals over the RAM data bus.

In another embodiment of the present invention, there is provided a method for I/O multiplexing a RAM bus. The method includes providing one or more control signals, such as a RAS signal and a CAS signal for a DRAM on a RAM control bus, and performing at least one read operation and/or write operation on a RAM data bus from circuits, other than the DRAM, during one or more of the DRAM's precharge cycles or periods.

BRIEF DESCRIPTION OF THE DRAWINGS

The invention, together with further objects and advantages thereof, may best be understood by reference to the following description taken in conjunction with the accompanying drawings in which:

FIG. 1b is a state diagram that illustrates a typical state machine that can be implemented and accomplished within the ASIC in FIG. 1a;

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

The present invention provides methods and apparatuses that enable a greater number of I/O related signals to be input and output from an IC having a limited number of dedicated I/O pins. The invention achieves the foregoing, in one embodiment, by using existing RAM data bus lines, during DRAM precharge periods, to input and/or output miscellaneous data signals between the IC and one or more external circuits or devices.

Figure 1A:
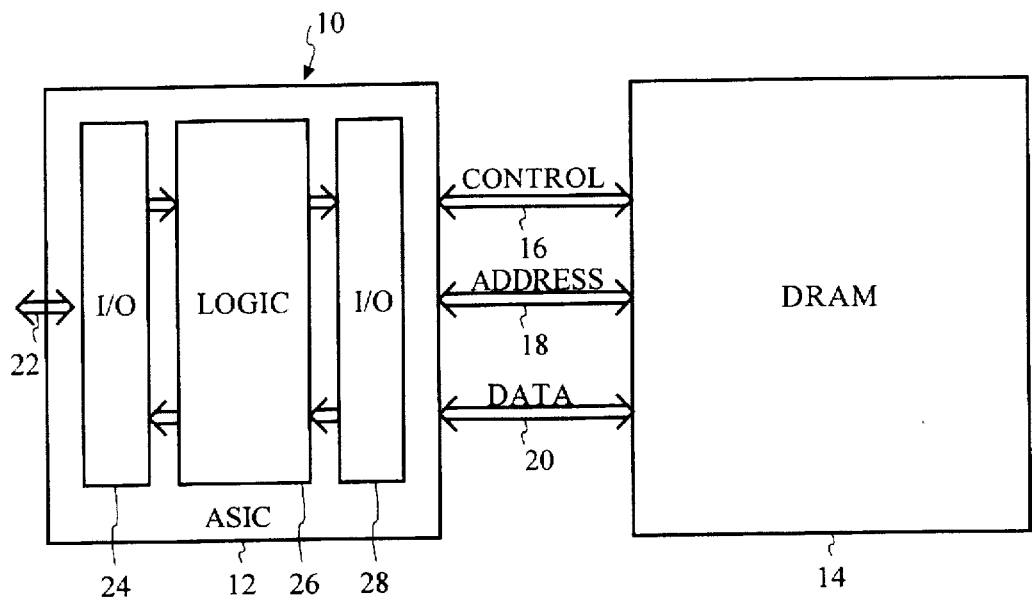
FIG. 1a is a block diagram of a conventional memory and I/O system having an ASIC and a DRAM.
Figure 1B:
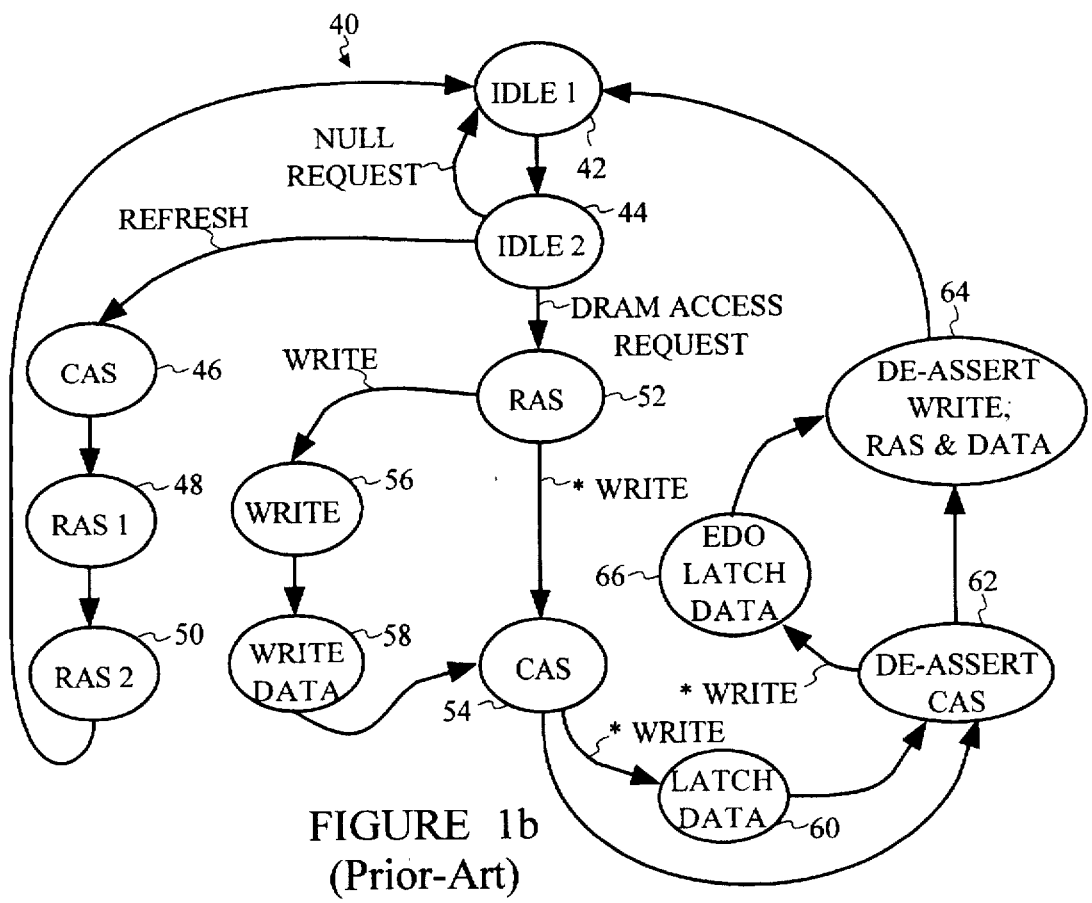

To facilitate discussion of the operation of the present invention, the function of a conventional logic circuit, such as logic circuit 26 in FIG. 1a, will first be discussed. Logic circuit 26 typically includes a circuit in the form of a sequential logic circuit that determines the operation of DRAM 14 in response to DRAM access request signals and/or DRAM refresh request signals. FIG. 1b is a state diagram that illustrates one example of a typical state machine 40 that can be accomplished within logic circuit 26 and used for this purpose.

State machine 40 essentially asserts and de-asserts control signals that are provided to DRAM 14 in accordance with one or more operating modes of memory and I/O system 10. By way of example, memory and I/O system 10 can include operating modes for writing data to DRAM 14, reading data from DRAM 14 and refreshing data stored within DRAM 14. As shown, state machine 40 typically includes a first idle state 42 and a second idle state 44 during which DRAM access requests and DRAM refresh requests can be received. Until such a request is received, state machine 40 will cycle between first idle state 42 and second idle state 44.

Upon receiving a DRAM refresh request (e.g., by way of a signal from another circuit, such as from within memory and I/O system 10), a DRAM refresh operation will begin. State machine 40 will begin the DRAM refresh operation by entering a CAS assert state 46 when a column access strobe (CAS) control signal is asserted onto DRAM control bus 16. Next, a row access strobe (RAS) assert state 48 is entered when a RAS control signal is asserted onto DRAM control bus 16 allowing the refresh of DRAM 14 to be completed. Additionally, at the end of state 48, the CAS control signal will be de-asserted. The next state is a RAS de-assert state 50 during which the RAS control signal is de-asserted. Finally, state machine 40 returns to first idle state 42.

This type of DRAM refresh operation is a essentially a conventional CAS before RAS refresh operation, as is well known in the art. It is recognized that other DRAM refresh operations may include additional states and may be ordered differently. Refresh operations and states such as these and others, are well known to those skilled in the art.

Upon receiving a DRAM access request (e.g., write or read request), a DRAM access operation will begin. State machine 40 will begin the DRAM access operation by entering RAS assert state 52 during which a RAS control signal is asserted onto DRAM control bus 16. If the DRAM access request was a write request, then a write enable signal is asserted in write assert state 56, and the state machine proceeds to enter drive data state 58, during which a drive data control signal is asserted thereby allowing data received over ASIC I/O interface 22 to be driven onto DRAM data bus 20. The state machine proceeds to enter CAS assert state 54. Conversely, if a read request is received (e.g., *write), then state machine 40 enters CAS assert state 54 directly.

In CAS assert state 54, a CAS control signal is asserted onto DRAM control bus 16. As shown, if the request is a write request, then state machine 40 proceeds to de-assert CAS state 62.

Conversely, if the request is a read request then latch data assert state 60 is entered during which a latch data control signal is asserted thereby allowing data on DRAM data bus 20 to be latched by internal I/O circuitry circuit 28 and output by internal I/O circuitry circuit 24 onto ASIC I/O interface 22. Next, state machine 40 enters a de-assert CAS state 62 during which the CAS control signal (asserted back in state 54) is de-asserted.

Next, in de-assert state 64 the write enable signal (asserted in state 56), the RAS control signal (asserted in state 52), and the drive data control signal (asserted in state 58) are each de-asserted (as applicable).

Finally, the DRAM access operation is completed, following de-assert state 64, when state machine 40 returns to first idle state 42. As with the DRAM refresh operation, DRAM access operations and states such as these and others, are also well known to those skilled in the art.

Furthermore, those skilled in the art will recognize that the states shown in state machine 40 may be rearranged for particular systems, and that additional states and/or control signals may be included. For example, for systems having an extended data out (EDO) DRAM, for read requests, latch data state 60 can be deleted from state machine 40 (i.e., replaced by a line linking state 54 directly to state 62), and an EDO latch data state 66 may be inserted between states 62 and 64. Upon entering EDO latch data state 66 an EDO latch data control signal will be asserted which allows data on DRAM data bus 20 to be latched by internal I/O circuitry circuit 28 and output by internal I/O circuitry circuit 24 onto ASIC I/O interface 22. It is further recognized that first idle state 42 and second idle state 44 can be represented by a single idle state (not shown) or by a plurality of idle states.

Regardless of the number of idle states, in typical memory and I/O system 10, DRAM 14 will have an inherent RAS and/or CAS precharge period that occurs during one or more of the idle states. During such an idle state the DRAM cannot be accessed. By way of example, consider a memory and I/O system having a RAM & I/O controller that operates with a 20 nanosecond (nsec) clock cycle (i.e., 50 MHz frequency), and a DRAM having a 35 nsec RAS precharge period. In such a system an idle state is typically included about every 8 to 16 clock cycles. Thus, for this exemplary system the idle state may be required to last for about two clock cycles or more (i.e., 40 nsec) so as to allow for the 35 nsec RAS precharge period. Notice, however, that as a result of the RAS precharge period the RAM buses, and in particular RAM data bus 20, are essentially unused for one or more clock cycles.

In the example above, if for every 8 clock cycles there are 2 idle clock cycles, then the RAM data bus is unused for about 20% of the time. Similarly, if for every 16 clock cycles there are 2 idle clock cycles, then the RAM data bus is unused for about 11% of the time. Moreover, because the industry trend appears to be towards faster processors and ASICs, depending on the DRAM there can be several clock cycles that are essentially "wasted" during an idle state, or precharge period.

The present invention presents novel methods and apparatuses that take advantage of these "wasted" clock cycles (i.e., time) by passing miscellaneous data signals over at least a portion of the unused RAM data bus during the associated idle state(s). As a result, additional I/O operations can be performed by an IC without having to add additional I/O data lines and/or increase the size of the circuit die.

Figure 2A:
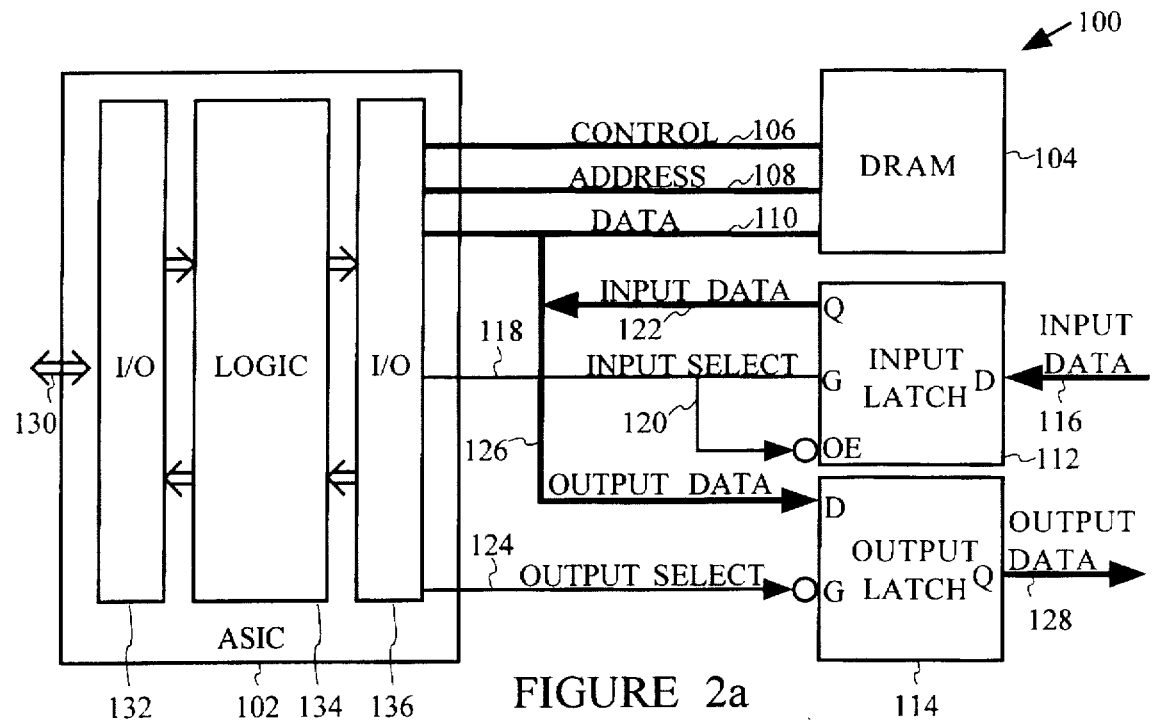
FIG. 2a is a block diagram illustrating a memory and I/O system in accordance with one embodiment of the present invention, having a RAM & I/O controller, a DRAM, an input latch, and an output latch.

FIG. 2a is a block diagram of a memory and I/O system 100 in accordance with one embodiment of the present invention. Memory and I/O system 100 includes a RAM & I/O controller 102 and a DRAM 104 that are coupled together through a control bus 106, an address bus 108, and a data bus 110. RAM & I/O controller 102 includes an I/O interface 130, a first internal I/O circuit 132, a logic 134, and a second internal i/O circuit 136. RAM & I/O controller 102 can, for example, be a custom IC or a semi-custom IC, such as an ASIC, or may be implemented by a number of chips.

DRAM 104 can for example be a standard DRAM, such as a TC5118325BJ DRAM circuit available from Toshiba America Electronic Components, Inc. of Irvine, Calif., or any like DRAM circuit. Optionally, DRAM 104 can for example be an EDO DRAM, such as a MSM5432128 DRAM circuit available from OKI Semiconductor, Inc. of Sunnyvale, Calif., or any like EDO DRAM circuit.

As shown in FIG. 2a, memory and I/O system 100 also includes an input latch 112 that is coupled to RAM & I/O controller 102 and data bus 110. Input latch 112 is arranged to provide for the inputting of miscellaneous data signals onto data bus 110 at specific times. The timing of latch 112 is discussed in detail hereinafter. Preferably, these miscellaneous data signals can be processed within RAM & I/O controller 102 and provided by RAM & YO controller 102 through I/O interface 130 to other circuits or devices. As shown, input latch 112 is also coupled to an input data line 116, at input node (D), from which it initially latches the miscellaneous data signals at specific times.

The latching and subsequent outputting of miscellaneous data by input latch 112 is controlled by an input latch select signal that is generated by logic 134 within RAM & I/O controller 102 and asserted onto an input latch select line 118. Input latch select line 118 applies the input latch select signal directly to the input latch 112 (e.g., through a gate (G) node) which causes input latch 112 to latch the miscellaneous data from input data line 116 (e.g., when the input latch signal is equal to a logic 1). As shown, input latch 112 can also include an output enable (OE) input 120 that is arranged to provide the latched data within input latch 112 onto a latched input data line 122 (e.g., when the input latch signal is equal to a logic 0). As such, latched input data line 122 is arranged to provide the latched input data onto data bus 110 (e.g., through a (Q) output).

Also shown in FIG. 2a is an output latch 114 that is coupled to RAM & I/O controller 102 and data bus 110. Preferably, output latch 114 provides for the outputting of miscellaneous data signals from RAM & I/O controller 102 onto data bus 110 at specific times. These miscellaneous data signals can then be provided by output latch 114 (e.g., through a (Q) node) onto a latched output data line 128 for use by other circuits or devices.

As shown, output latch 114 is also coupled to data bus 110 through an output data line 126 (e.g., at input node (D)) and is arranged to receive miscellaneous data signals at specific times over output data line 126. The latching and subsequent outputting of miscellaneous data by output latch 114 is controlled by an output latch select signal that is generated by logic 134 within RAM & I/O controller 102 and asserted onto an output latch select line 124. Output latch select line 124 applies the output latch select signal to the output latch 114 (e.g., at a gate (G) node) which causes output latch 114 to latch the miscellaneous data from output data line 126 (e.g., when the output latch signal is equal to a logic 0).

In other embodiments of the present invention, memory and I/O system 100 can include one or more input and/or output latches wherein selection lines/signals can be dedicated for use by each latch or shared by two or more latches. It is further recognized that various logic states and signals can be used to control the latches. Additionally, the latches may include miscellaneous data conditioning, buffering, or memory circuits as well.

Figure 2B:
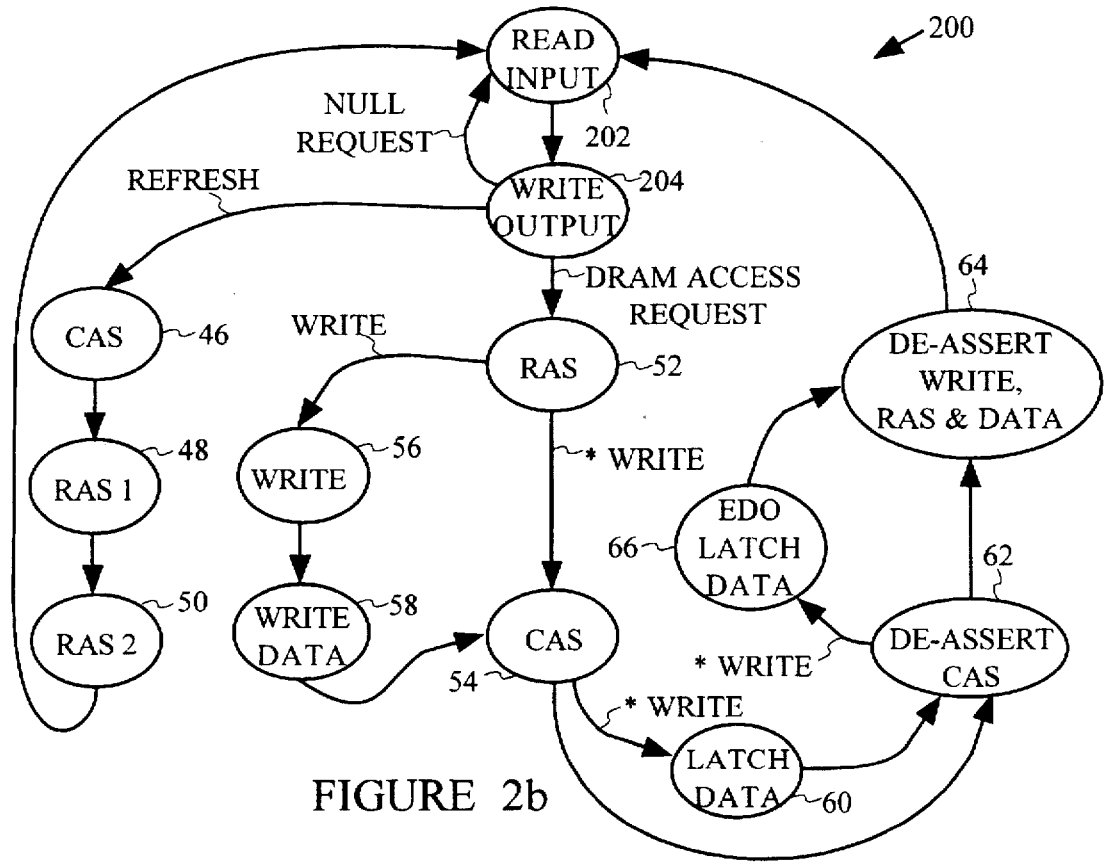
FIG. 2b is a state diagram illustrating a state machine for use in the memory and I/O system of FIG. 2a, in accordance with one embodiment of the present invention.

FIG. 2b is a state diagram illustrating a state machine 200 in accordance with one embodiment of the present invention. State machine 200 can, for example, be embodied within a sequential logic circuit within logic 134 (see FIG. 2a). State machine 200 may, in one embodiment, be similar to conventional state machine 40, with some exceptions, for example state machine 200 substitutes a read input state 202 for first idle state 42, and a write output state 204 for second idle state 44 (see FIG. 1b).

When in read input state 202, state machine 200 asserts an input select signal onto input select line 118. The input select signal causes input latch 112 to latch input data from input data line 116 onto to output the latched input data onto data bus 110. As such, during the read input state miscellaneous data can be read into RAM & I/O controller 102 and supplied to other circuits or devices through I/O interface 130. At the end of read input state 202, the input select signal is de-asserted which causes input latch 112 to cease latching data from input data line 116 and outputting the latched input data onto data bus 110.

When in write output state 204, state machine 200 asserts an output select signal onto output select line 124 to output miscellaneous data onto data bus 110. The output select signal causes output latch 114 to latch the miscellaneous data from data bus 110 and output them onto latched output data line 128. As such, during the write output state miscellaneous data can be written from RAM & I/O controller 102 and supplied to other circuits or devices through output latch 114. At the end of write output state 204, the output select signal is de-asserted which causes output latch 114 to stop latching miscellaneous data from data bus 118.

As illustrated by the null request directional arrow in FIG. 2b, state machine 200 continues to alternate between states 202 and 204 until either a refresh or DRAM access request is made.

Thus, with an embodiment of the present invention, the time associated with the precharge period of DRAM 104 may be used to drive miscellaneous data signals between RAM & I/O controller 102 and one or more external latches (e.g., 112 and 114) over the existing data bus 110.

In one embodiment, the read input states and/or write output states can be timed to occur in accordance with the transistioning of a clock signal. Thus, if the clock signal (which can for example be provided in logic 134) transitions several times during the precharge period, then several read input and/or write output states can be completed. It is further recognized that the precharge period can include CAS precharge periods.

It is further contemplated that in some systems other periods of time, wherein the RAM data bus is not actually being used for access to DRAM 104, may be used to drive miscellaneous data signal in accordance with the present invention. For example, the driving of miscellaneous data signals onto data bus 110 can begin early, that is during the period immediately preceding a RAS de-assert, or likewise may end late, that is during the period immediately following a RAS assert.

In one embodiment of the present invention, input latch 112 and output latch 114 can be embodied in an I/O device that is coupled to RAM & I/O controller 102. It is further recognized that one or more latches (input or output) can be combined into a multiple I/O latch that provides bi-directional I/O for a plurality of miscellaneous data signals.

Figure 3:
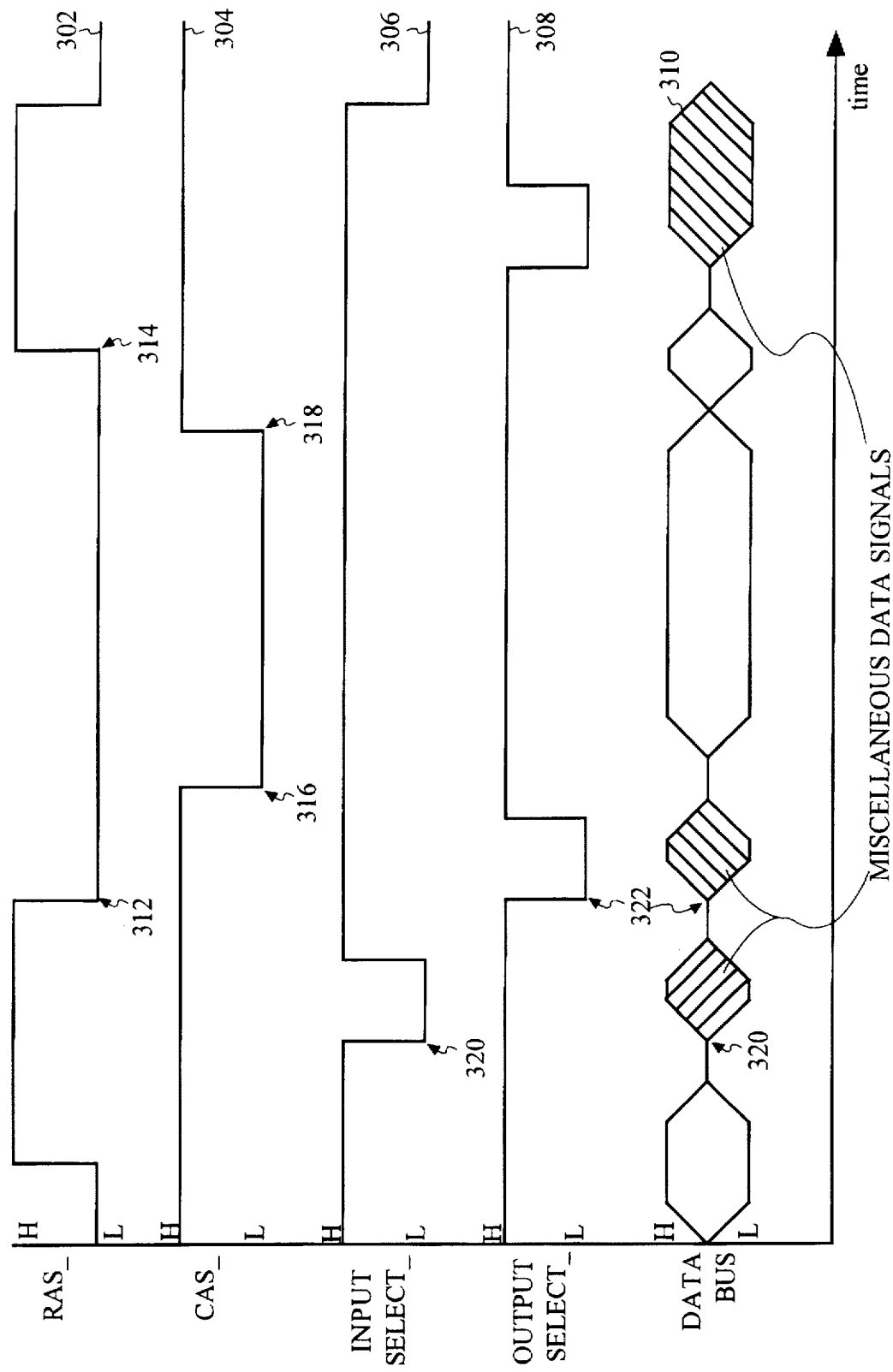
FIG. 3 is a timeline graph illustrating one possible timing sequence for the signals in the memory and I/O system in FIG. 2a, and the state machine in FIG. 2b, in accordance with one embodiment of the present invention.

FIG. 3 is a timeline graph illustrating one possible timing sequence for the signals in memory and I/O system 100 and state machine 200, in accordance with one embodiment of the present invention. FIG. 3 includes a RAS_control signal 302, a CAS_control signal 304, an INPUT SELECT_signal 306, an OUTPUT SELECT_sinal 308, and a DATA BUS signal(s) 310.

As shown, when RAS_302 is logical 0 (e.g., low voltage) RAS is asserted, when logical 1 (e.g., high voltage) RAS is de-asserted. For example, RAS_302 is asserted at time 312 which corresponds to RAS assert state 52 in FIG. 2b, and de-asserted at time 314 which corresponds to de-assert state 64 in FIG. 2b.

Similarly, when CAS_304 is logical 0 (e.g., low voltage) CAS is asserted, when logical 1 (e.g., high voltage) CAS is de-asserted. For example, CAS_304 is asserted at time 316 which corresponds to CAS assert state 54 in FIG. 2b, and de-asserted at time 318 which corresponds to de-assert state 62 in FIG. 2b.

As shown in FIG. 3, when INPUT SELECT_signal 306 is asserted, at time 320, miscellaneous data signals can be driven from input latch 112 onto data bus 110 to RAM & I/O controller 102 (as represented in DATA BUS signal(s) 310). Similarly, when OUTPUT SELECT_signal 308 is asserted, at time 322, miscellaneous data signals can be driven from RAM & I/O controller 102 onto data bus 110 to output latch 114 (as represented in DATA BUS signal(s) 310). It is recognized that the timing signals in FIG. 3 can be modified to include a plurality of miscellaneous reads and/or writes during the precharge periods wherein either RAS and/or CAS are de-asserted. Additionally, the miscellaneous reads and writes may be timed by one or more clock signals, as discussed above.

While this invention has been described in terms of several preferred embodiments, there are alterations, permutations, and equivalents which fall within the scope of this invention. For example, although discussion herein is made with reference to an early-write DRAM technique (i.e., write before CAS), the invention may be adapted, using knowledge commonly possessed by those skilled in the art, to work with an output-enabled controlled, or OR-controlled, DRAM technique (i.e., write after CAS). Conventional early-write and OE-controlled DRAM techniques are well known and are not further elaborated here in order not to unnecessarily obscure the invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. A RAM and I/O controller capable of being coupled to a RAM by way of a control bus and a data bus, the RAM and I/O controller comprising:

logic configured to receive input signals including a refresh request signal and a RAM access request signal, said logic providing a RAS output signal and a CAS output signal to said control bus in response to said input signals, wherein said logic provides at least one idle state wherein said RAM is in a precharge cycle prior to developing said RAS output and said CAS output signals, and wherein during said idle state said logic performs at least one of a write operation and a read operation on said RAM data bus.

2. The RAM and I/O controller as recited in claim 1 wherein said logic further provides an output select signal during said write operation.

3. The RAM and I/O controller as recited in claim 1 wherein said logic further provides an input select signal during said read operation.

4. The RAM and I/O controller as recited in claim 1 wherein said logic provides a clock signal, and said logic performs at least one of said read operation and said write operation in response to said clock signal.

5. The RAM and I/O controller as recited in claim 4 wherein said clock signal provides a plurality of timing transitions during said idle state, and said logic performs at least one of said read operation and said write operation in response to said timing transitions.

6. A memory and I/O system for use with a RAM comprising:

a control bus configured for controlling said RAM;

a data bus configured to write data to and receive data from said RAM;

an I/O device having an I/O select, said I/O device being coupled to said data bus; and logic coupled to said control bus, said data bus, and said I/O device, said logic configured to receive input signals including a refresh request signal and a RAM access request signal, said logic providing a RAS output signal and a CAS output signal to said control bus in response to said input signals, wherein said logic provides at least one idle state wherein said RAM is in a precharge cycle prior to developing said RAS output and said CAS output signals, and wherein during said idle state said logic performs at least one of a write operation and a read operation on said RAM data bus.

7. The memory and I/O system as recited in claim 6 wherein said logic provides an output select signal during said write operation to said I/O device, said output select signal enabling said I/O select.

8. The memory and I/O system as recited in claim 6 wherein said I/O device is arranged to latch an output data signal from said data bus when enabled with said output select signal.

9. The memory and I/O system as recited in claim 8 wherein said I/O device is further coupled to an output data bus, said I/O device being arranged to provide said latched output data signal to said output data bus.

10. The memory and I/O system as recited in claim 6 wherein said logic provides an input select signal during said read operation to said I/O device, said input select signal enabling said I/O select.

11. The memory and I/O system as recited in claim 10 wherein said I/O device is arranged to provide a latched input data signal to said data bus when enabled with said input select signal.

12. The memory and I/O system as recited in claim 11 wherein said I/O device is further coupled to an input data bus, said I/O device is arranged to latch an input data signal from said input data bus.

13. The memory and I/O system as recited in claim 11 wherein said I/O device is arranged to latch an input data signal from said input data bus when enabled with said input select signal.

14. The memory and I/O system as recited in claim 6 wherein said logic provides a clock signal, and said logic performs at least one of said read operation and said write operation in response to said clock signal.

15. The memory and I/O system as recited in claim 14 wherein said clock signal provides a plurality of timing transitions during said idle state, and said logic performs at least one of said read operation and said write operation in response to said timing transitions.

16. An apparatus for I/O multiplexing a RAM bus comprising:
   means for providing control signals including a RAS signal and a CAS signal to a RAM over a control bus, wherein said means provides at least one idle state wherein said RAM is in a precharge cycle; and
   means for performing at least one of a read operation and a write operation over a data bus coupled to said RAM from other than said RAM during said precharge cycle.

17. The apparatus as recited in claim 16 further comprising means for latching an output data from said data bus during said write operation.

18. The apparatus as recited in claim 17 wherein said means for latching an output data from said data bus includes means for providing said latched output data to an output data bus.

19. The apparatus as recited in claim 16 further comprising means for providing a latched input data signal to said data bus during a read operation.

20. The apparatus as recited in claim 19 wherein said means for providing a latched input data signal to said data bus includes means for latching an input data signal from an input data bus.

21. The apparatus as recited in claim 16 wherein said means for performing at least one of a read operation and a write operation includes a clock means for controlling the timing said read and write operations.

22. The apparatus as recited in claim 21 wherein said clock means causes a plurality of said read and write operations to occur during said precharge cycle.

23. A method for I/O multiplexing a RAM data bus comprising:
   providing control signals including a RAS signal and a CAS signal to a RAM over a control bus;
   providing at least one idle state wherein said RAM is in a precharge cycle; and
   performing at least one of a read operation and a write operation over a data bus coupled to said RAM from other than said RAM during said precharge cycle.

24. The method as recited in claim 23 further comprising latching an output data from said data bus during said write operation.

25. The method as recited in claim 24 further comprising providing said latched output data to an output data bus.

26. The method as recited in claim 23 further comprising providing a latched input data signal to said data bus during a read operation.

27. The method as recited in claim 26 further comprising latching an input data signal from an input data bus.

28. The method as recited in claim 23 further comprising controlling the timing of said read and write operations.

29. The method as recited in claim 28 further comprising causing a plurality of said read and write operations to occur during said precharge cycle of said RAM.

* * * * *